United States Patent
Newman

(10) Patent No.: US 7,513,338 B2
(45) Date of Patent: Apr. 7, 2009

(54) BRAKE SYSTEM FOR A WELL SERVICE OR DRILLING HOIST

(75) Inventor: Frederic M. Newman, Midland, TX (US)

(73) Assignee: Key Energy Services Inc., Houston, TX (US)

( * ) Notice: Subject to any disclaimer, the term of this patent is extended or adjusted under 35 U.S.C. 154(b) by 261 days.

(21) Appl. No.: 11/517,920

(22) Filed: Sep. 8, 2006

(65) Prior Publication Data

US 2007/0056811 A1    Mar. 15, 2007

Related U.S. Application Data

(60) Provisional application No. 60/716,673, filed on Sep. 13, 2005.

(51) Int. Cl.
*F16D 55/08* (2006.01)
*F16D 65/14* (2006.01)

(52) U.S. Cl. .................. 188/72.9; 188/72.6; 188/204 A

(58) Field of Classification Search ................ 188/72.1, 188/72.6, 72.9, 77 W, 204 A, 204 R
See application file for complete search history.

(56) References Cited

U.S. PATENT DOCUMENTS

| | | | |
|---|---|---|---|
| 2,009,889 A * | 7/1935 | Hild | 254/292 |
| 2,126,118 A * | 8/1938 | Kelley | 212/170 |
| 2,658,589 A | 11/1953 | Ashton | 188/151 |
| 2,928,505 A | 3/1960 | Wilson | 188/77 |
| 3,244,404 A | 4/1966 | Bender | 254/185 |
| 4,334,217 A | 6/1982 | Nield et al. | |
| 4,840,076 A | 6/1989 | Brubaker et al. | 74/143 |
| 2004/0162658 A1 | 8/2004 | Newman | |
| 2006/0163545 A1 | 7/2006 | Newman | |

OTHER PUBLICATIONS

PCT/US06/34787 International Search Report and the Written Opinion of the International Searching Authority, or the Declaration—Date of mailing Aug. 23, 2007.

* cited by examiner

*Primary Examiner*—Melody M Burch
(74) *Attorney, Agent, or Firm*—King & Spalding LLP

(57) ABSTRACT

The brake system includes a brake lever independent of, but capable of rotating about the same point as a bell crank. Upon receiving a downward force, a member extending from the lever strikes a portion of the bell crank and generates a force that cause the bell crank to rotate. Rotational action of the bell crank transfers rotational energy to an equalizer bar thorough a linkage system. The equalizer bar's rotation increases or decreases tension on brake bands that slow a tubing drum. A cylinder can activate and cause the equalizer bar to rotate, applying tension to the brake bands and slowing the drum. Rotational energy is transferred back to the bell crank through the linkage. The rotational energy is absorbed by a spring positioned between the bell crank and the brake lever, thereby reducing the amount of sudden force passed through the brake lever to an operator.

18 Claims, 8 Drawing Sheets

BRAKE SYSTEM FOR A WELL SERVICE OR DRILLING HOIST

STATEMENT OF RELATED PATENT APPLICATION

This non-provisional patent application claims priority under 35 U.S.C. § 119 to U.S. Provisional Patent Application No. 60/716,673, titled A Brake Handle Pivotal Around a Bell Crank For a Well Service or Drilling Hoist, filed Sep. 13, 2005. This provisional application is hereby fully incorporated herein by reference.

FIELD OF THE INVENTION

The present invention relates to braking systems. More specifically, the present invention relates to a brake system for hoist drums such as those used on drilling rigs, well service rigs, and the like.

BACKGROUND OF THE INVENTION

After an oil drilling rig drills a well and installs the well casing, the rig is dismantled and removed from the site. From that point on, a mobile repair unit, or workover rig, is typically used to service the well. Servicing includes, for example, installing and removing inner tubing strings, sucker rods, and pumps. This is generally done with a cable hoist system that includes a traveling block that raises and lowers the aforementioned tubing strings, sucker rods, and pumps.

U.S. Pat. No. 4,334,217 describes a system for monitoring the movement of a traveling block on a drilling rig. As described in the '217 patent, the traveling block can be raised or lowered beyond a safe limit. This is called "crown out" if the traveling block reaches its upper-most safe position, and "floor out" if it reaches its lower-most safe position. Crown out/floor out can result in equipment damage and present a hazard to personnel working on the equipment. Because it is often not possible for the operator of the cable hoist system to see the position of the traveling block, or because the operator can be otherwise distracted from monitoring the position of the traveling block, the operator can inadvertently exceed safe positions of the traveling block.

Drilling rigs and mobile well servicing units alike are often equipped with safety devices that prevent or a least reduce the possibility of the traveling blocks from reaching a crown out or floor out position. The techniques to prevent crown outs and floor outs can vary. These techniques include use of wire trip sensors, radar, ultrasonic sensors located near the crown, drum encoders, and wire rope counters as sensing devices that determine the blocks are too close to the crown. In addition, the safety systems may incorporate programmable logic control ("PLC") circuits to detect and actuate cylinders. In another embodiment, the safety system can be configured in a "fail safe" mode. When a circuit is broken in the fail safe mode, a cylinder is activated, thereby activating the braking system on the hoist to prevent the drilling line from additional movement.

While many different methods exist for preventing crown outs and floor outs, most have a single commonality, that being when a sensor or other device detects the pending crown out or floor out, the device sets the brakes for the tubing drum via a pneumatic or hydraulic cylinder. FIG. 1 provides a detailed drawing of a conventional tubing drum brake assembly 100. Although only one side of the drum 105 is shown for the sake of simplicity, a person of ordinary skill in the art will recognize that, in actuality, the tubing drum 105 typically has two brake flanges 115, one on each side of the tubing drum 105. Each side of the tubing drum 105 includes a brake band 120 wrapped around a flange 115. Each of the brake bands 120 are actuated by a equalizer bar 130. In one conventional embodiment, a common equalizer bar 130 actuates both of the brake bands 120 on the tubing drum 105. As shown in FIG. 1, the brake bands 120 are actuated by the equalizer bar 130 rotating in the clockwise direction, which generates tension on the brake bands 120, causing them to tighten up and apply pressure to the brake flanges 115. The pressure applied by the brake bands 120 causes the tubing drum 105 to slow or stop its rotation about the tubing core 110 depending on the amount of pressure applied by the brake bands 120 and causing a corresponding reduction in movement of the feed line 160 as shown in FIGS. 1-4.

As further shown in FIG. 1, the conventional braking system can rotate the equalizing bar 130, by applying a downward force on a brake handle 155. The brake handle 155 is attached to a brake lever 150 which rotates about a pivot point 145 when the downward force is applied to the brake handle 155. The rotation of the brake lever 150 rotates a bell crank 140 in a clockwise direction, the bell crank 140 and brake lever 150 being mechanically coupled to one another. The bell crank 140 is attached at one end to the brake lever 150 and attached at another end to the brake linkage 165 and rotates about pivot point 145. The brake linkage 165 is attached at the other end to the equalizer bar 130. The rotation of the bell crank 140 creates a tension in the brake linkage 165, thereby causing the equalizer bar 130 to rotate in the clockwise direction about a pivot point 125.

As the rig trips into the hole with heavy loads, the braking system heats up and the brake bands 120 expand, which can cause slack in the system 100. To compensate for this problem, conventional braking systems, like the one shown in FIG. 1, include an adjustment swivel 135 as part of the brake linkage 165. The adjustment swivel 135 can be rotated about the braking linkage 165 to shorten or lengthen the linkage 165 as the need arises. For example, as the brake bands 120 retain more heat and get longer, an operator will shorten the length of the brake linkage 165 through the use of the adjustment swivel 135. Conversely, as the brake bands 130 begin to cool and shorten, the operator will lengthen the linkage 165 by rotating the adjustment swivel 135. The objective for the operator is to maintain the brake handle 155 at a height that is comfortable for his use.

In order to effect the safe braking of the rig or hoist, the braking system 100 must operate under tight tolerances, which necessitates that the brake bands 120 remain in constant or virtually constant contact with the brake flanges 115. Because the weight of the brake handle 155 and brake lever 150 will provide sufficient down force to slow the rotation of the drum 105 the operator typically will lift up on the brake handle 155 and lever 150 as shown in FIGS. 2 and 3. By lifting the brake handle 155 and lever 150, the brake bands 120 provide less pressure on the brake flanges 115, thereby allowing the drum 105 to rotate at a higher rate of speed.

As discussed above and shown in greater detail in FIGS. 4 and 5, most conventional rig braking systems 400, 500 include additional features 405 to prevent a crown out or floor out event. The features can include a cylinder 410 which can be pneumatically or hydraulically operated. When activated, the cylinder 410 suddenly extends a rod 415 outward and provides pressure on a lever 420 that is attached to the equalizer bar 130. In response to the pressure, the equalizer bar 130 rotates clockwise causing the brake bands 120 to apply pressure to the brake flange 115, thereby slowing the drum 105 and the feed line 160. However, as shown in FIG. 5, because the equalizer bar 130 is also mechanically linked to the brake handle 155 via the brake linkage 165, bell crank 140, and brake lever 150, the brake handle 155 suddenly moves in the downward direction in response to the cylinder 410 firing. If the rig operator is in the vicinity of, or is holding the brake handle 155 up to reduce braking pressure on the drum 105, when the cylinder 410 fires, the operator may be injured by the brake handle's 155 sudden downward motion. Therefore, there is a need in the art for a braking system that allows the actuating cylinder to act independently of the brake handle so that when the brakes are set due to the detection of a crown out, floor out or other action or problem the brake handle will not be jerked out of the operator's hand and potentially cause injury.

SUMMARY OF THE INVENTION

The present invention supports a braking system that allows the actuating cylinder to be mechanically independent and unlinked from the brake handle so that when the brakes are set due to the detection of a crown out, floor out, or other action or problem the brake handle will not be jerked out of the operator's hand and potentially cause injury.

For one aspect of the present invention, the brake system can include brake flanges positioned on each side of a tubing drum. One or more brake bands can be frictionally engagable with each of the brake flanges. An equalizer bar can be coupled to the brake bands. The equalizer bar is capable of rotating about a fixed point to increase or decrease the tension on the brake bands. A linkage system can be coupled to the equalizer bar for transferring energy from a bell crank that can rotate about another fixed point. A brake lever can include an arm coupled thereto. The brake lever can rotate about a fixed point that is the same as or different than the bell crank. Upon receiving a force, the brake lever can rotate in a direction about the fixed point and the arm can strike the bell crank and cause it to rotate in the same direction during the period of contact between the arm and the bell crank.

For another aspect of the present invention, the brake system can include brake flanges positioned on each side of a tubing drum. One or more brake bands can be frictionally engagable with each of the brake flanges. An equalizer bar can be coupled to the brake bands. The equalizer bar is capable of rotating about a fixed point to increase or decrease the tension on the brake bands. A linkage system can be coupled to the equalizer bar for transferring energy from a bell crank that can rotate about another fixed point. A brake lever can include an arm coupled thereto. The brake lever can rotate about a fixed point that is the same as or different than the bell crank. Upon receiving a force, the brake lever can rotate in a direction about the fixed point and the arm can strike the bell crank and cause it to rotate in the same direction during the period of contact between the arm and the bell crank. The brake system can further include a spring coupled between the brake lever and the bell crank. When the brake lever is lifted to reduce the tension of the brake bands on the brake flange, the spring can transmit the lifting force of the brake lever to the bell crank, thereby causing the bell crank to rotate in the same direction as the brake lever and further transmitting the rotational energy to the equalizer bar to reduce braking on the tubing drum.

Various aspects of the present invention may be more clearly understood and appreciated from a review of the following detailed description of the disclosed embodiments and by reference to the drawings and claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

BRIEF DESCRIPTION OF THE DRAWINGS

For a more complete understanding of exemplary embodiments of the present invention and the advantages thereof, reference is now made to the following description in conjunction with the accompanying drawings in which.

DETAILED DESCRIPTION OF THE EXEMPLARY EMBODIMENTS

Exemplary embodiments of the present invention will now be described in detail with reference to the figures for an exemplary operating environment of operating a drum braking assembly for a well service or drilling hoist. While the exemplary braking system of the present invention is described in the context of an operative environment used for braking systems to slow or stop a drum on a well service or drilling hoist, those of ordinary skill in the art will recognize that the braking system can be used in many other applications to slow or stop other types of vehicles or devices.

Figure 1:
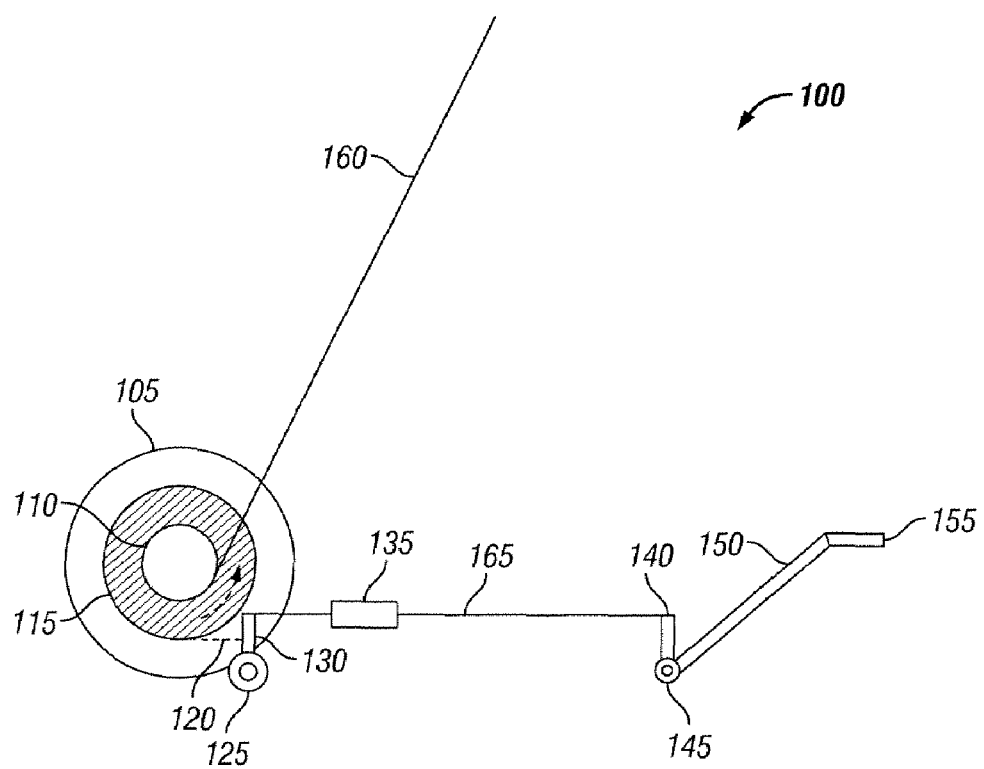
FIG. 1 illustrates a side view of a conventional drum braking assembly.
Figure 2:
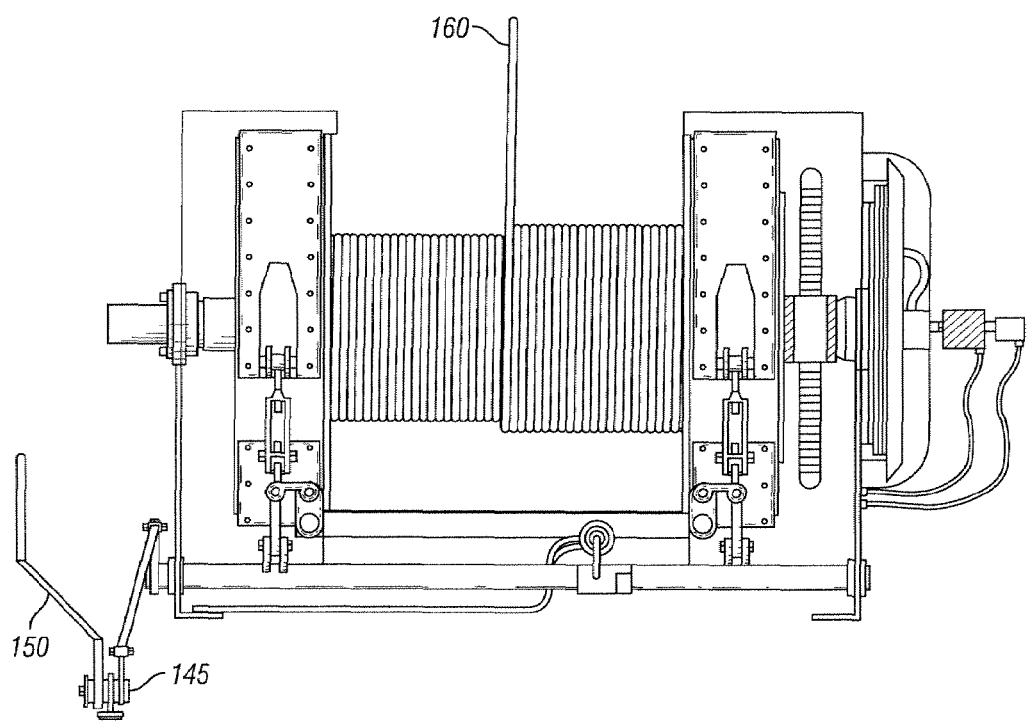
FIG. 2 illustrates a frontal view of the conventional drum braking assembly of FIG. 1.
Figure 3:
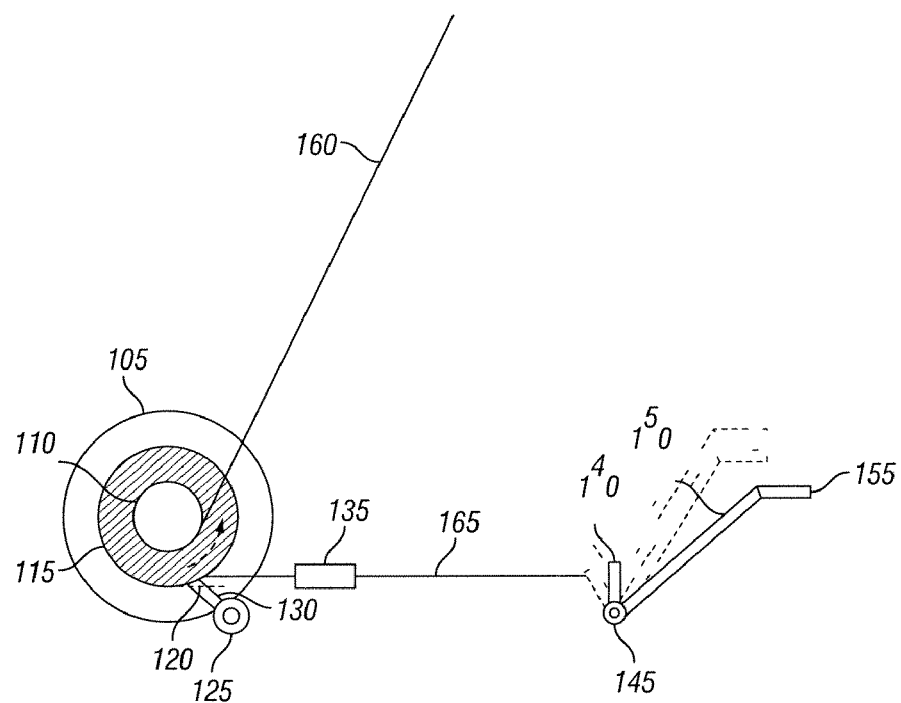
FIG. 3 illustrates the effect of a force being applied to the brake handle on the conventional drum braking assembly of FIG. 1.
Figure 4:
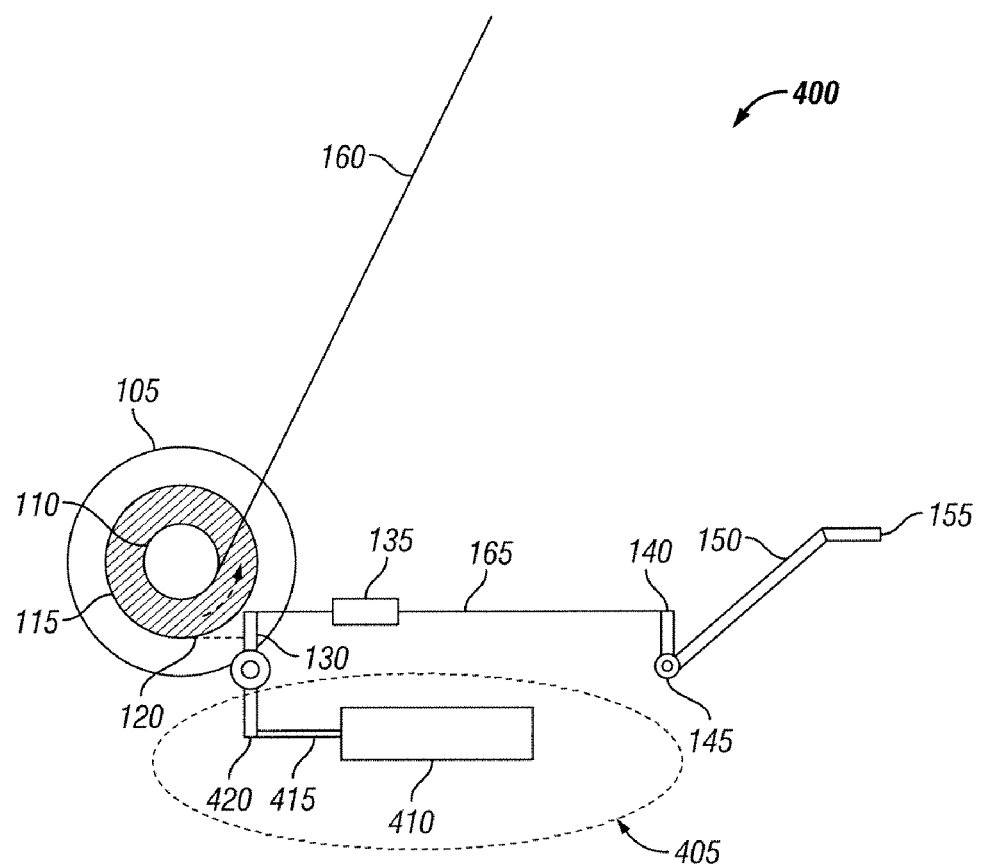
FIG. 4 illustrates a side view of another conventional drum braking assembly that includes a safety actuating system to prevent crown outs and floor outs.
Figure 5:
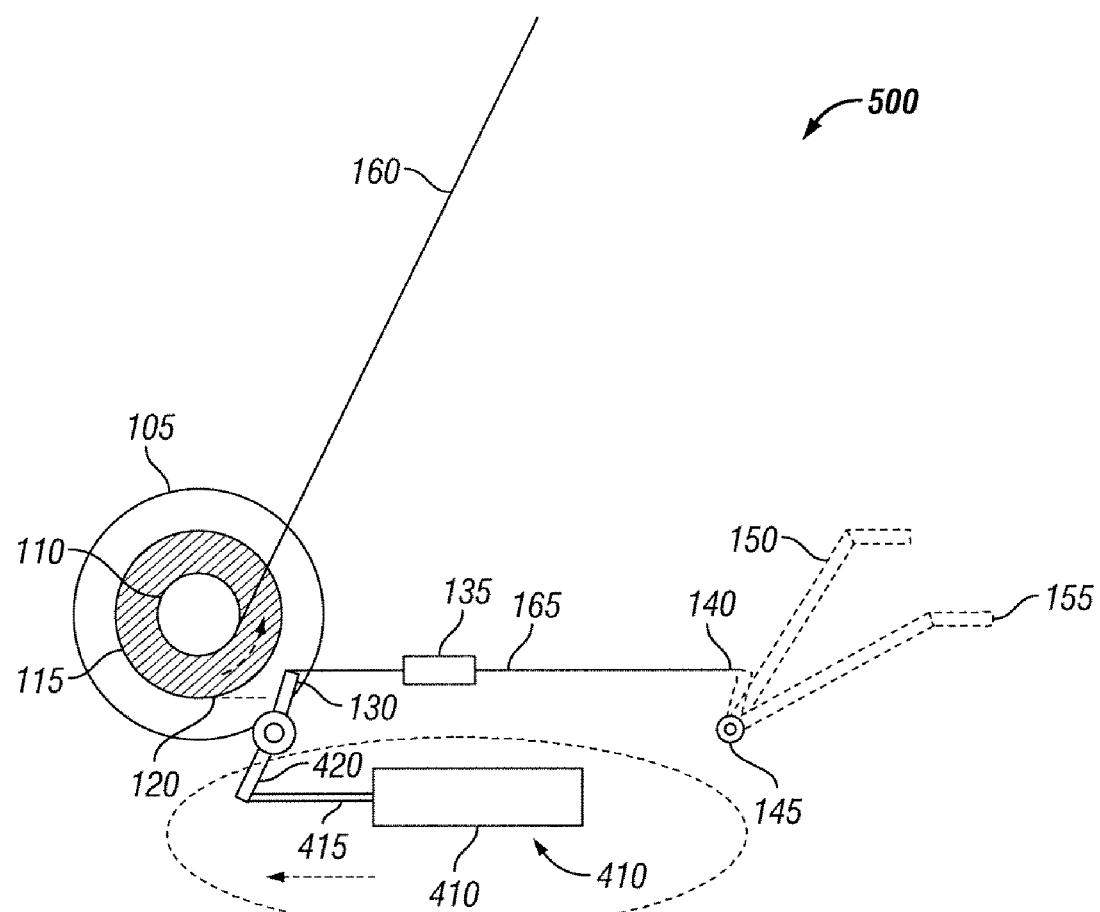
FIG. 5 illustrates the effect of a force being applied to the equalizer bar by a safety cylinder in the conventional drum braking assembly of FIG. 4.
Figure 6:
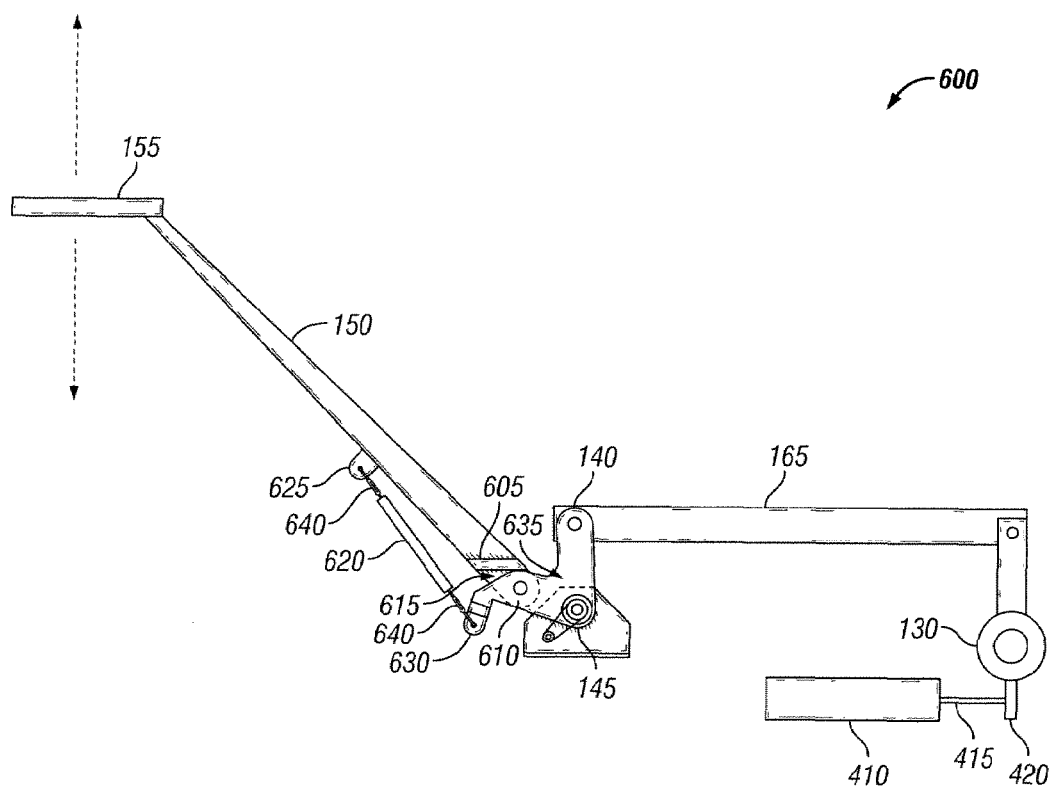
FIG. 6 illustrates a brake assembly having a brake lever mechanically independent of a bell crank according to one exemplary embodiment of the present invention.

A method and system for a brake lever pivoting about a bell crank to activate a braking system will now be described more fully hereinafter with reference to FIGS. 6-8, which show an exemplary embodiment of the present invention. Turning now to FIG. 6, the exemplary drum braking system 600 includes a brake handle 155 attached to a brake lever 150. The brake lever 150 extends between the brake handle 155 and a pivot device 610. In one exemplary embodiment, the pivot device 610 is a pivot pin, however, those of ordinary skill in the art will recognize that other methods and techniques are available that allow a rod or shaft to pivot about a fixed point. The brake lever 150 can be constructed of steel, aluminum or other metallic and non-metallic materials known to those of ordinary skill in the art. In one exemplary embodiment, the brake lever 150 includes a bore hole that is capable of accepting a bearing (not shown). The bore hole, and bearing therein, are sized such that they may be slidably fitted to the pivot device 610. The bearing reduces the wear on the brake lever 150 caused by the numerous rotational cycles of applying and releasing the brake bands 120.

The brake lever 150 also includes a brake application member 605 attached to and extending along one side of the lever 150. In one exemplary embodiment, the brake application member 605 is a piece of steel flat bar that is welded to the side of the lever 150 at an angle that is substantially orthogonal to the lever 150, as shown in FIG. 6, however those of ordinary skill in the art will recognize that other modes of attachment and other angles of attachment could be implemented to achieve the same results of this invention. The member 605 is designed to positively engage the bell crank 635 and establish a mechanical connection when a force is applied in the downward direction on the brake handle 155. However, when the bell crank 635 is pushed forward by the activation of the cylinder 410 and its application of force against the equalizer bar 130 by way of the lever 420, the motion of the bell crank 635 will not generate a corresponding motion in the brake handle 155.

The brake lever 150 further includes a spring attachment arm 625 attached to and extending outward from one side of the brake lever 150. The spring attachment arm 625 is capable of accepting one end of a spring and is made of steel in one exemplary embodiment. The drum braking system 600 further includes a bell crank 635 attached for rotational movement about a fixed pivot point 145 and attached to another pivot point 140 on the linkage 165. In one exemplary embodiment, the fixed pivot point 145 is a bearing block, however, other devices known to those of ordinary skill in the art may be used. The pivot point 140, linkage 165, adjustment swivel 135, equalizer bar 130, cylinder 410, cylinder rod 415, lever 420, brake bands 120, brake flange 115 and tubing drum 105 are generally as described in FIGS. 1-5.

Figure 7:
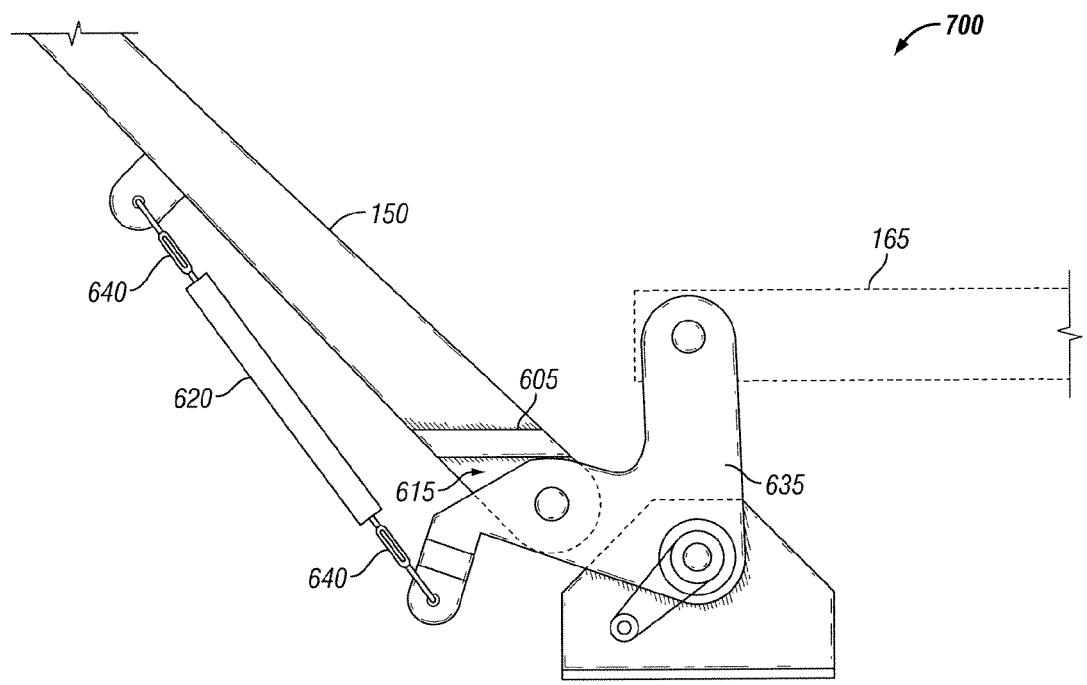
FIG. 7 illustrates a close up view of the drum braking assembly of FIG. 6 according to one exemplary embodiment of the present invention.
Figure 8:
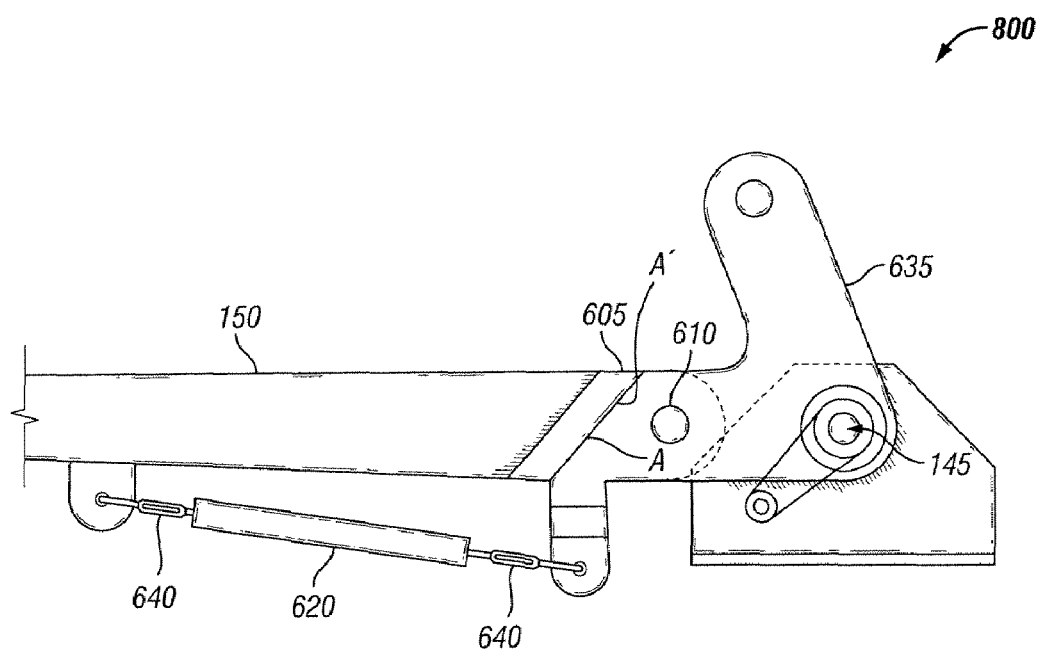
FIG. 8 illustrates the brake lever activating the braking system through contact with the bell crank in the drum braking system of FIG. 6 according to one exemplary embodiment of the present invention.

Unlike the conventional drum breaking systems described in FIGS. 1-5, the bell crank 635 of FIGS. 6-8 is not in a state of direct mechanical connection with the brake lever 150. Instead, the bell crank 635 is connected to the brake lever 150 by way of a spring 620. The spring 620 is attached at one end to a spring attachment arm 625 on the brake lever 150 and attached on its opposing end to a bell crank attachment arm 630 on the bell crank 635. In one exemplary embodiment, the ends of the spring 620 are attached to adjustable turnbuckles 640 that allow the linear distance between the spring attachment arm 625 and the bell crank attachment arm 630 to be increased or decreased, however, those of ordinary skill in the art will recognize that many other methods exist for attaching and providing adjustment means for the spring 620. As shown in FIG. 6, when the brake system is not activated, there is a gap 615 between the bell crank 635 and the brake application member 605.

FIG. 7 provides a view 700 of the brake lever and bell crank when the brake lever is being raised by an operator according to the exemplary brake system 600 of FIG. 6. Now referring to FIGS. 6 and 7, when the operator pulls the brake handle 155 up to ensure the minimum amount of pressure is applied to the brake bands 120 the gap 615 between the brake application member 605 and the bell crank 635 remains. The tension in the spring 620 caused by the lifting of the handle 155 by the operator will lift the bell crank 635 by way of the bell crank attachment arm 630. The force of the spring 620 lifting and rotating the bell crank 635 in a clockwise manner will direct the linkage 165 to rotate the equalizer bar in a clockwise manner, thereby reducing the pressure applied by the brake bands 120 on the brake flange 115.

Returning to FIG. 6, the exemplary invention reduces the force applied to the brake handle 155 when the cylinder 410 is actuated according to one exemplary embodiment of the invention. When the cylinder 410 actuates and extends the cylinder rod 415 against the lever 420 the equalizer bar 130 rotates in a counter-clockwise direction, which causes the brake bands 120 to tighten around the brake flange 115 and slow the drum 105. The rotation of the equalizer bar 130 causes a corresponding rotation in the bell crank 635 by way of the linkage 165. As the bell crank 635 rotates in the counter-clockwise direction, the spring 620 absorbs the rotational force of the bell crank 635 and extends, thereby allowing the brake handle 155 to remain substantially in the same position as it was prior to the cylinder 410 firing. While the brake handle 155 may show some limited movement in situations where the handle 155 is not being held by the operator, in situations where the operator is holding the handle 155 when the cylinder 410 causes the equalizer bar 130 to rotate, the force required for the operator to continue holding the handle 155 is reduced, thereby significantly reducing the opportunity of injury to the operator.

FIG. 8 illustrates the interaction 800 of the brake lever 150 and the bell crank 635 when a downward force is applied by an operator to the brake handle 155 in one exemplary embodiment of the exemplary drum braking system 600. Now referring to FIGS. 6 and 8, when the operator applies a downward force to the brake handle 155, the brake lever 150 begins to rotate counter-clockwise about the pivot point 610. In an alternative exemplary embodiment, the brake lever 150 can rotate about the same fixed point 145 as the bell crank 635 without causing a direct rotational action on the bell crank 635. Unlike in the conventional braking system 100, the bell crank 635 does not begin to rotate about the pivot point 145 upon the initial movement of the brake lever 150. Instead, the bell crank begins to rotate when the member 605 is rotated to a point where it abuts the bell crank 635 at points "A" and "A'" and begins to apply a force thereto, causing the bell crank 635 to begin its counter-clockwise rotation, as shown in FIG. 8. As the bell crank 635 rotates, it causes a corresponding rotation in the equalizer bar 130, through the linkage 165, that tightens the brake bands 120 on the brake flange 115 and causes the tubing drum 105 to slow or stop.

In summary, an exemplary embodiment of the present invention describes methods and apparatus for independent operation of a bell crank and brake lever in a drum braking system. By allowing for independent operation of the lever and bell crank, the current invention allows an actuating cylinder to act independently of the brake handle so that when the brakes are set by the firing of a cylinder, the handle will not be suddenly forced in a downward direction and cause potential injury to the operator. From the foregoing, it will be appreciated that the exemplary embodiments of the present invention overcome the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. While there have been shown and described exemplary embodiments of the present invention, it will be evident to those skilled in the art that various modifications and changes may be made thereto without departing from the spirit and the scope of the present invention.

I claim:

1. A brake system for a drum comprising:
   a brake flange;

a brake band frictionally engageable with the brake flange;
an equalizer bar coupled to the brake band;
a first means for generating rotational movement of the equalizer bar;
a bell crank coupled to the first means for generating rotational movement of the equalizer bar, wherein the bell crank is capable of rotational movement about a first point;
a brake lever capable of rotational movement about a second point;
an arm coupled to the brake lever, wherein upon a rotation of the brake lever in a first direction about the second point, the arm is capable of striking the bell crank to cause the bell crank to rotate in the first direction about the first point.

2. The brake system of claim 1, further comprising a spring coupled at a first end to the brake lever and at a second end to the bell crank, wherein upon the rotation of the brake lever in a second direction about the second point, the spring is capable of transmitting a force to the bell crank causing the bell crank to rotate in the second direction about the first point.

3. The brake system of claim 2, further comprising:
a cylinder comprising a rod capable of extending and retracting;
a second means for generating rotational movement of the equalizer bar about the first point, wherein the rod of the cylinder is capable of striking the second means for generating a rotational movement of the equalizer bar to cause the equalizer bar to rotate about the first point, the rotation of the equalizer bar mechanically transferred to the bell crank through the first means for generating rotational movement of the equalizer bar and causing the bell crank to rotate in the first direction, the rotational force of the bell crank being absorbed by the spring and generating substantially less rotational movement in the brake lever than the rotational movement of the bell crank.

4. The brake system of claim 3, wherein the second means for generating rotational movement of the equalizer bar is a lever coupled to the equalizer bar.

5. The brake system of claim 4, wherein the lever coupled to the equalizer bar in a direction substantially orthogonal to a long axis of the equalizer bar.

6. The brake system of claim 2, wherein the spring further comprises an adjustment means having a first and a second end, the first end of the adjustment means coupled to the brake lever and the second end of the adjustment means coupled to the first end of the spring, the adjustment means capable of increasing or decreasing the distance between the first end of the spring and the brake lever.

7. The brake system of claim 2, wherein the spring further comprises an adjustment means having a first and a second end, the first end of the adjustment means coupled to the bell crank and the second end of the adjustment means coupled to the second end of the spring, the adjustment means capable of increasing or decreasing the distance between the second end of the spring and the bell crank.

8. The brake system of claim 1, wherein the first means for generating rotational movement of the equalizer bar is a linkage member.

9. The brake system of claim 8, wherein the linkage member further comprises an adjustment means, wherein the adjustment means reduces or extends the length of a long axis of the linkage.

10. The brake system of claim 1, further comprising a brake handle coupled to the brake lever.

11. The brake system of claim 1, wherein the first and second points are the same.

12. A brake system for a drum comprising:
a brake flange;
a brake band frictionally engageable with the brake flange;
an equalizer bar coupled to the brake band and capable of rotating about a first point;
a linkage member having a first end and a second end, said first end coupled to the equalizer bar and capable of generating rotational movement of the equalizer bar about the first point;
a bell crank coupled to the second end of the linkage member, wherein the bell crank is capable of rotational movement about a second point;
a brake lever capable of rotational movement about a third point;
an arm coupled to the brake lever, wherein upon a rotation of the brake lever in a first direction about the third point, the arm is capable of striking the bell crank to cause the bell crank to rotate in the first direction about the second point; and
a spring coupled at a first end to the brake lever and at a second end to the bell crank, wherein upon the rotation of the brake lever in a second direction about the second point, the spring is capable of transmitting a force to the bell crank causing the bell crank to rotate in the second direction about the first point.

13. The brake system of claim 12, further comprising:
a cylinder comprising a rod capable of extending and retracting;
a second means for generating rotational movement of the equalizer bar, wherein the rod of the cylinder is capable of striking the second means for generating a rotational movement of the equalizer bar to cause the equalizer bar to rotate.

14. The brake system of claim 13, wherein the second means for generating rotational movement of the equalizer bar is a lever coupled to the equalizer bar.

15. The brake system of claim 14, wherein the lever coupled to the equalizer bar in a direction substantially orthogonal to a long axis of the equalizer bar.

16. The brake system of claim 12, further comprising a brake handle coupled to the brake lever.

17. The brake system of claim 12, wherein the spring further comprises an adjustment means having a first and a second end, the first end of the adjustment means coupled to the brake lever and the second end of the adjustment means coupled to the first end of the spring, the adjustment means capable of increasing or decreasing the distance between the first end of the spring and the brake lever.

18. The brake system of claim 12, wherein the second and third points are the same.

* * * * *

UNITED STATES PATENT AND TRADEMARK OFFICE
CERTIFICATE OF CORRECTION

PATENT NO. : 7,513,338 B2  Page 1 of 1
APPLICATION NO. : 11/517920
DATED : April 7, 2009
INVENTOR(S) : Frederic M. Newman It is certified that error appears in the above-identified patent and that said Letters Patent is hereby corrected as shown below:

Claim 5, column 7, line 43, change the phrase, "to the equalizer bar in a direction substantially orthogonal to" to -- to the equalizer bar extends in a direction substantially orthogonal to --.

Claim 15, column 8, line 47, change the phrase, "coupled to the equalizer bar in a direction substantially" to -- coupled to the equalizer bar extends in a direction substantially --.

Signed and Sealed this

Ninth Day of June, 2009

JOHN DOLL
*Acting Director of the United States Patent and Trademark Office*